Nov. 21, 1961  K. WINTERSBERGER ET AL  3,009,779
PRODUCTION OF HYDROXYLAMINE
Filed Feb. 24, 1954
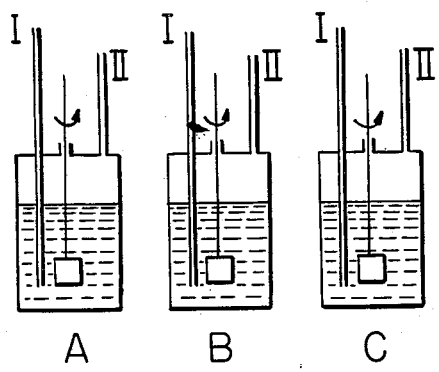
I = GAS INLET TUBE
II = GAS OUTLET TUBE
INVENTORS:
KARL WINTERSBERGER
KURT JOCKERS
HERMANN MEIER
BY Maryall, Johnston,
Cook & Root
ATT'YS.

3,009,779
PRODUCTION OF HYDROXYLAMINE
Karl Wintersberger, Kurt Jockers, and Hermann Meier, Ludwigshafen (Rhine), Germany, assignors to Badische Anilin- & Soda-Fabrik Aktiengesellschaft, Ludwigshafen (Rhine), Germany
Filed Feb. 24, 1954, Ser. No. 412,353
Claims priority, application Germany Feb. 25, 1953
7 Claims. (Cl. 23—190)

This invention relates to a new and improved method for the production of hydroxylamine.

It is known that hydroxylamine can be prepared by catalytic reduction of nitric oxide with hydrogen by means of platinum catalysts in acid medium. Catalysts of pure platinum or of pure platinum applied to a carrier are, however, not satisfactory in every respect. Among other things, they have only a relatively short life.

We have now found that the said drawback can be avoided by using as catalysts noble metal alloys of platinum which are insoluble in the dilute acid used. These alloys may be used applied to a carrier or also without any carrier substance. Alloys of platinum with about 1 to 10 percent of silver, gold, iridium or palladium, for example, have been found to be suitable. It has been found that not only do these mixed catalysts have a longer life than pure platinum catalysts, but when the relative proportions of the components of the alloy are suitable, a greater conversion of nitric oxide per hour per gram of alloy can be obtained than when using pure platinum catalysts. The most favourable composition for the life of the catalyst and the conversion of nitric oxide depends on the choice of the metal to be alloyed with the platinum.

It is preferable to use as catalysts platinum alloys which have been prepared by common reduction of compounds of the alloy components in solid form or as solutions, if desired in the presence of carriers. This reducing treatment can be effected for example with formic acid, formaldehyde or hydrogen at ordinary or raised temperature. Suitable carriers for the catalysts according to this invention are the materials already known for this purpose provided they are stable to acid, as for example active carbon, pumice, barium sulfate or kieselguhr. Graphite may be used as the carrier substance with special advantage. The catalysts applied to graphite are characterised in particular by their high conversion of nitric oxide per unit of weight of the platinum alloy. Moreover they are extremely resistant to attrition. Whereas catalysts which are applied to other carriers are constantly being comminuted and thereby giving rise to difficulties in the separation of the catalyst from the reaction solution, this phenomenon does not occur with the use of graphite.

The following example will further illustrate this invention but the invention is not restricted to this example. The three comparative tests carried out in the following example are illustrated in schematic form by the accompanying drawing wherein the apparatus employed consisted of three containers A, B and C, each being equipped with a suitable stirring device and adapted to contain the dilute acid reaction medium with the catalyst suspended therein. Each of the containers is also equipped with a gas inlet tube I for the introduction of gaseous reactants and a gas outlet tube II to remove gaseous reaction products.

*Example*

Equal amounts of a mixture of 1 part by volume of nitric oxide and 2 parts by volume of hydrogen are led into three entirely identical stirring containers A, B and C under the same conditions at a temperature of 45° C., and atmospheric pressure. Each of the stirring containers is charged with an equal amount of a suspension of a catalyst in 3.5 normal sulfuric acid. The catalyst in container A consists of pure platinum, that in container B consists of 95% by weight of platinum and 5% by weight of gold and the catalyst in container C consists of 99% of platinum and 1% of iridium. The three catalysts are prepared by reduction of the corresponding aqueous salt solutions with formic acid in the presence of graphite powder under identical conditions. The weight ratio of metal to graphite is in each case 1:100. After an experimental period of 6 hours, the catalysts are separated from the reaction solutions and mixed with fresh sulfuric acid. After renewing the acid in this way eleven times, the activity of the catalyst in container A has fallen to 50% of the original value, whereas the activity of the catalysts in containers B and C is not reduced to half until after 16 and 15 changes of acid respectively. The total conversion of nitric oxide per gram of catalyst (i.e. platinum or platinum alloy) is 2380 grams in container A, 3540 grams in container B and 3420 grams in container C. The average conversion of nitric oxide per gram of catalyst per hour is 30.1 grams in container A, 35.8 grams in container B and 37.2 grams in container C.

We claim:

1. An improved process for the production of hydroxylamine by catalytic reduction of nitric oxide with hydrogen in a dilute acid medium, which comprises using as a catalyst suspended in said dilute acid medium a noble metal alloy of platinum and about one to ten percent by weight of a noble metal other than platinum, said catalyst being insoluble in the dilute acid medium.

2. An improved process for the production of hydroxylamine by catalytic reduction of nitric oxide with hydrogen in a dilute acid medium, which comprises using as a catalyst suspended in said dilute acid medium a noble metal alloy applied to a carrier, said alloy consisting essentially of platinum and about one to ten percent by weight of a noble metal other than platinum, and said catalyst being insoluble in the dilute acid medium.

3. An improved process as claimed in claim 2 wherein the noble metal other than platinum is a member selected from the group consisting of silver, gold, iridium and palladium.

4. An improved process for the production of hydroxylamine by catalytic reduction of nitric oxide with hydrogen in a dilute acid medium, which comprises using as a catalyst suspended in said dilute acid medium a noble metal alloy applied to a powdered graphite carrier, said alloy consisting essentially of platinum and about one to ten percent by weight of a noble metal other than platinum, and said catalyst being insoluble in the dilute acid medium.

5. An improved process as claimed in claim 4 wherein the noble metal other than platinum is a member selected from the group consisting of silver, gold, iridium, and palladium.

6. An improved process for the production of hydroxylamine by catalytic reduction of nitric oxide with hydrogen in a dilute acid medium, which comprises using as a catalyst suspended in said dilute acid medium an alloy of 95 percent by weight of platinum and 5 percent by weight of gold, said alloy being applied to a powdered graphite carrier.

7. An improved process for the production of hydroxylamine by catalytic reduction of nitric oxide with hydrogen in a dilute acid medium, which comprises using as a catalyst suspended in said dilute acid medium an alloy of 99 percent by weight of platinum and 1 percent by weight of iridium, said alloy being applied to a powdered graphite carrier.

(References on following page)

References Cited in the file of this patent

UNITED STATES PATENTS

| | | |
|---|---|---|
| 1,156,674 | Ellis | Oct. 12, 1915 |
| 1,268,692 | Dewar et al. | June 4, 1918 |
| 1,426,517 | Sulzberger | Aug. 22, 1922 |
| 2,406,172 | Smithells | Aug. 20, 1946 |
| 2,552,279 | Houpt | May 8, 1951 |
| 2,628,889 | Benson | Feb. 17, 1953 |
| 2,749,217 | Deutschman | June 5, 1956 |

OTHER REFERENCES

Mellor: "Comprehensive Treatise on Inorganic Chemistry," Longmans, Green and Co., New York, 1923, vol. 8, page 203.